Feb. 27, 1945.  E. K. CLARK  2,370,146
THERMOSTAT
Filed May 21, 1941
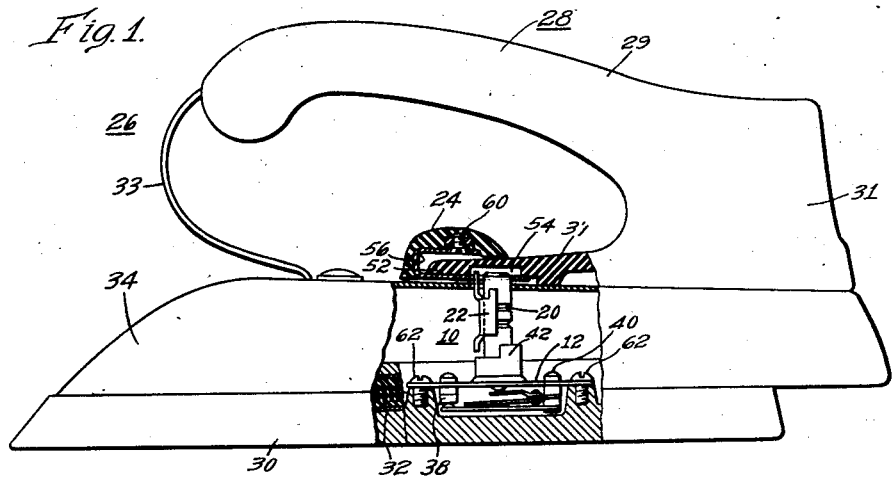
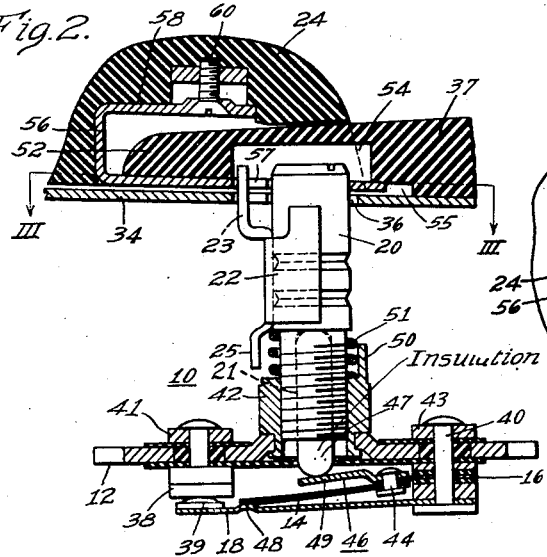
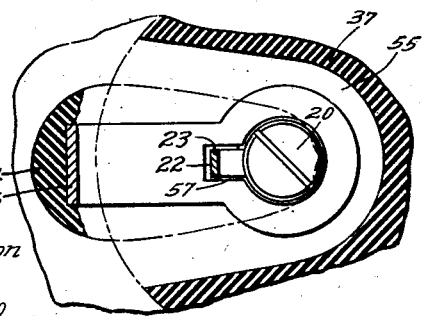
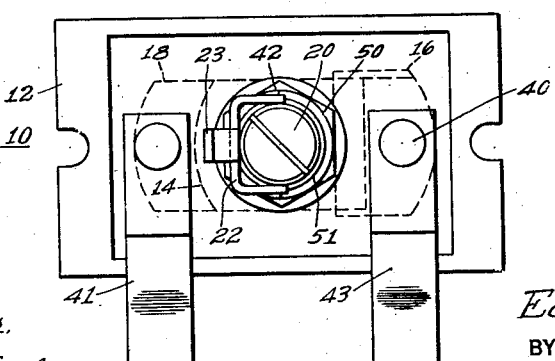
WITNESSES:
INVENTOR
*Earl K. Clark*
BY
ATTORNEY Patented Feb. 27, 1945

2,370,146

UNITED STATES PATENT OFFICE 2,370,146

THERMOSTAT

Earl K. Clark, Mansfield, Ohio, assignor to Westinghouse Electric & Manufacturing Company, East Pittsburgh, Pa., a corporation of Pennsylvania Application May 21, 1941, Serial No. 394,469

8 Claims. (Cl. 219—25)

My invention relates to thermostats and in particular to a thermostatic structure for sadirons.

An object of my invention is to provide a thermostatic structure embodying a control shaft mounted substantially normal to a bimetallic element and having an offset bracket attached thereto which cooperates with an adjusting knob.

Another object of my invention is to provide a sadiron thermostat having a bracket attached to the adjusting screw which is adapted to pass through the cover plate of a sadiron and loosely cooperate with an adjusting knob.

Still another object of my invention is to provide an inexpensive, rugged, easily manufactured thermostatic structure which readily cooperates with a loosely mounted adjusting knob located above the iron cover plate.

A further object of my invention is to provide a thermostat having a centrally mounted adjusting screw which cooperates with a bimetallic element resiliently attached to the supporting structure for adjusting the operation of the thermostat.

Still another object of my invention is to provide a thermostat having a resilient contact carrying arm rigidly attached to the thermostat supporting structure and a bimetallic element resiliently attached to the supporting structure intermediate the resilient arm and said structure, whereby as the bimetallic element changes its curvature in response to changes in temperature, such element will force the contact carrying arm into an open position.

Still a further object of my invention is to provide a thermostat for a sadiron embodying a vertically extending adjusting screw which passes through the cover plate of said iron and which flexibly cooperates with an adjusting lever positioned above the cover plate.

Other objects of my invention will either be pointed out specifically in the course of the following description of a device embodying my invention or will be apparent from such description.

In the accompanying drawing,

Figure 1 is a side elevational view, partly in section of an iron having the thermostat embodying my invention associated therewith;

Fig. 2 is an enlarged sectional view of the thermostat embodying my invention associated with the iron control knob;

Fig. 3 is a sectional view taken along the line III—III of Fig. 2; and

Fig. 4 is a top view of the thermostat embodying my invention.

Referring to the accompanying drawing, in which like reference characters indicate like parts in the several figures, there is shown a thermostat 10 embodying a supporting structure 12, a bimetallic element 14, insulatedly attached to the supporting structure by means of a resilient member 16, a resilient contact carrying member 18, an adjusting screw 20, a substantially U-shaped bracket 22, attached to the adjusting screw 20, and a control knob 24 associated with the U-shaped bracket 22 for rotating the adjusting screw to vary the operation of the bimetallic element 14 associated with a sadiron 26, including a handle 28, sole plate 30, heating element 32 and cover plate 34.

The thermostat 10, embodying my invention, is shown as being associated with the sadiron structure 26, embodying the handle 28, sole plate 30, heating element 32 and suitable cover plate 34. However, it is to be understood that the thermostat 10 may be associated with any other suitable iron structure. The cover plate 34 extends or slopes downwardly towards the rear of the iron 26 while the adjusting screw 20 of thermostat 10 is mounted substantially normal to the sole-plate 30.

The heating element 32 is, in this instance, positioned upon and attached to the sole plate and supplies heat thereto in a well known manner. The energization of said element 32 is controlled by thermostat 10 which is connected in series with the heating element in a familiar manner, so as to maintain the preselected temperature in the sole plate.

The cover plate 34 is positioned upon sole plate 30 and extends above the heating element and thermostat structure 10. An opening 36 is located at substantially the midpoint of said cover plate for receiving the adjusting screw 20 and U-shaped bracket 22 of the thermostat 10, which normally extend slightly above the cover plate. Said opening 36 is substantially circular so as to permit said adjusting screw 20 and the upper end of bracket 22 to rotate therein.

The handle 28 includes a substantially horizontally positioned grip portion 29 retained above the iron cover plate 34 by an upwardly extending rear portion 31 and a front curved strap-like member 33 which is fastened thereto and rigidly attached to the cover plate 34. A skirt portion 37, integral with the rear handle portion 31 extends towards the front of the iron and just above or in contact with the cover plate 34. The skirt 37 extends over the aperture 36 in cover plate 34. An upwardly extending aperture or notch 54 is positioned within the lower surface of the skirt portion 37 in line with the aperture 36 to receive the upper ends of the thermostat adjusting screw 20 and U-shaped bracket 22. In addition, there is an enlarged undercut portion 55 (see Figs. 2 and 3) in the lower surface of skirt 37 to receive and permit the movement of a mounting bracket 56 for the adjusting knob 24, as hereinafter described.

The thermostat 10 comprises a supporting structure 12 which, in this instance, is a flat rectangular or circular plate having a threaded bushing 42 attached thereto for receiving the threaded adjusting screw 20. Said threaded bushing 42 is preferably attached to the supporting structure 12 at the midpoint thereof. However, it is to be understood that such bushing may be mounted at any other suitable point. An upwardly extending stop member or portion 50 is attached to or is made as an integral part of the bushing 42 to limit the rotative movements of the adjusting screw 20 and bracket 22, as hereinafter described. A helically-coiled resilient member 51 is positioned about the upper part of the threaded portion of screw 20 to act as a restraining cushion therefor, in a well known manner. A stationary contact 38 which cooperates with the movable contact 39, as hereinafter described, is insulatedly attached to the supporting structure 12 at one end or side thereof in a well known manner. A suitable terminal member or strap 41 is electrically associated with the stationary contact 38 in any well known manner. A second terminal 43 is attached to a rivet-like member 40 located diametrically opposite to the stationary contact 38. The member 40 insulatedly mounts the resilient bimetallic element supporting member 16, the free end of which is attached to the bimetallic element 14, and electrically mounts the resilient contact carrying member 18 for rigidly attaching them to the supporting structure 12.

The bimetallic element 14 is, in this instance, an elongated strip type element which does not carry any current. However, said element has a potential imposed thereon due to its engagement with rivet 40. The right hand relatively stationary end of element 14 is rigidly attached to the resilient supporting member 16 by means of a suitable rivet 44. In addition, an upwardly off-set finger-like member 46 is attached to said stationary end of the bimetallic element 14 and the movable end of the resilient member 16 by the rivet 44. The resilient member 16 is a relatively small member which is rigidly and insulatedly attached by one end thereof to the supporting structure 12 by the rivet 40. The bimetallic element 14 and finger 46 are rigidly attached to the free end of said resilient member 16. Accordingly, it is obvious that finger 46 will move with bimetallic element 14 as the resilient member 16 is flexed or biased about the rivet structure 40. The bimetallic element 14 is mounted intermediate the resilient contact carrying member 18 and the supporting structure 12 and is positioned so that as it increases in temperature, it will flex downwardly or in a counterclockwise direction. Said element 14 will then engage an upwardly extending protuberance or boss 48 in the resilient contact carrying member 18, causing the cooperating contacts 38 and 39 to become disengaged.

The finger-like member 46 has an upwardly positioned ledge or offset portion 49. Said member extends intermediate the bimetallic element 14 and supporting structure 12 and said offset portion 49 is disposed substantially in line with the adjusting screw 20 so as to receive an insulating member 47 substantially centrally positioned within the lower end of said adjusting screw as its position is selectively changed by an operator through the control knob 24, as hereinafter described. The finger member 46, being in contact with element 14 and thus associated with rivet 40, has an electrical potential imposed thereon. However, the insulating member 47 in adjusting screw 20 prevents said screw from becoming energized.

The resilient contact carrying member 18 is mounted at one end by the rivet structure 40 to the supporting structure 12 substantially in line with the stationary end of the resilient member 16. Said member 18 has a movable contact 39 rigidly attached to its free or movable end. The resilient contact carrying member is arranged in such a manner that it biases the movable contact to a closed position in engagement with stationary contact 38. An upwardly extending boss 48 is positioned within member 18 for engaging the movable end of the bimetallic element 14 so as to move the member 39 in response to the flexing action of said element.

Since the resilient contact carrying member 18 is electrically associated with movable contact 39 and the rivet structure 40, which in turn are adapted to be electrically associated with the terminals 41 and 43, it follows that the flow of current through the thermostat will be substantially as follows: for example, from terminal 41 to the stationary contact 38, through movable contact 39, resilient contact carrying member 18, rivet structure 40 and out the second terminal structure 43. Accordingly, it is obvious that the resilient contact carrying member 18 will tend to increase in temperature in response to the flow of current therethrough, it being understood that the rate of increase in temperature will be in direct ratio with the quantity of current squared and resistance of such member 18.

The adjusting screw 20 embodies, in this instance, an elongated member having its lower end threaded so as to engage the threaded bushing 42 rigidly attached to the supporting structure 12. The elongated adjusting screw 20 is of such length as to just pass above the cover plate 34 of the iron structure 26 when the thermostat 10 is mounted upon the sole plate 30 thereof. An upwardly extending elongated notch 21 is formed within the lower portion of the screw 20 for receiving the insulating pin 47.

The U-shaped bracket 22 is, in this instance, an elongated channel-shaped member having an inside diameter substantially equal to that of the screw 20 so as to fit tightly theeragainst (see Figs. 2 and 4). The U-shaped bracket 22 is spot-welded to the sides of the adjusting screw 20 and is adapted to extend along its longitudinal axis. An upwardly projecting longitudinally extending portion 23 is offset from the adjusting screw at the upper end of the bracket 22. In addition, an offset depending portion 25 is located at the lower end of bracket 22. The offset portion 23 extends above the cover plate 34 by-passing through aperture 36 therein to cooperate with the adjusting knob 24 in a manner hereinafter described. The depending portion 25 of the U-shaped bracket 22 extends downwardly and is adapted to cooperate with or engage the upwardly extending stop portion 50, attached to the threaded bushing 42, as the adjusting screw 20 and bracket 22 are rotated, so as to limit the rotative movements of the adjusting screw 20.

The adjusting knob 24 comprises in this instance, a member which fits about the end of the skirt portion 37 of handle 28 with a shape which blends in with that of the handle 28 and the entire iron structure 26. However, it is to be understood that adjusting knob 24 may have any desired configuration. The knob 24 is connected with the adjusting screw 20 and bracket 22 and retained in juxtaposition with end of the skirt 37 by the J-shaped bracket 56.

The J-shaped control-knob-carrying bracket 56 comprises an elongated member having a keyhole shaped aperture 57 located at one end and a raised portion 58 at the other end thereof. The upper or raised portion 58 of the J-shaped bracket 56 receives the control knob 24 and is rigidly attached thereto by means of a suitable screw 60. The bracket 56 and knob 24 thus move as a unit. The lower part of the J-shaped bracket 56 is positioned within the notch 55 in skirt 37 and is free to rotate therein. The bracket 56 rests upon the cover plate 34 and retains the control knob 24 in a position where it is readily actuable by an operator without releasing her hold of the handle 28.

The J-shaped bracket 56 through the keyhole shaped aperture 57 loosely engages the upper end portion 23 of the U-shaped bracket 22 (as shown in Fig. 3) and fits over the upper end of screw 20 (see Fig. 3). The bracket 56 and knob 24 thus are retained in assembled position but are free to rotate about the adjusting screw 20 as an axis as the forward end of control knob 24 is rotated in an arc along the front edge of the skirt 52 in response to the movement of an operator's hand.

The upper end portion 23 of bracket 22 fitting within the keyhole shaped aperture 57 in the J-shaped bracket 56 is also rotated as the knob 24 and bracket 56 are rotated. Inasmuch as the bracket 22 is rigidly attached to the adjusting screw 20, it follows that screw 20 is also rotated as knob 24 is moved. In addition, it is obvious that due to the loose connection between the J-shaped bracket 56 and screw 20 and bracket 22 that the bracket 56 will easily rotate the screw 20 and bracket 22 without any binding action therebetween. This structure permits variation in the angle between the lower portion of the bracket 56 and the screw 20.

The control knob 24 and attached J-shaped bracket 56 are assembled to the thermostatic structure when assembling the sadiron structure 26, substantially as follows:

When assembling the iron structure 26, the thermostatic structure 10 is rigidly attached to the sole plate 30 by suitable screws 62, with the adjusting screw 20 substantially normal to the sole plate 30. The handle 28 is positioned upon the cover plate 34, before the cover plate is applied to the soleplate with the aperture or upwardly extending notch 54 in skirt 37 positiond above the aperture 36 in cover plate 34. The rear end of handle 28 is then rigidly attached to cover plate, say by screws (not shown). The front end of the handle 28 is then rigidly attached to the cover plate 34 by the bracket structure 33. The control knob 24, attached to the J-shaped bracket 56 by screw 60, is then positioned upon the cover plate, with the portion of the bracket 56 which has the aperture 57 therein disposed intermediate the cover plate 34 and the lower surface of the skirt 37 of handle 28. The composite structure including the attached cover plate 34 and handle 28 and the control knob 24 with the attached J-shaped bracket 56 are then positioned upon the sole-plate 30. The cover plate 34 is rigidly attached to the sole plate by screws (not shown), while the adjusting screw 20 and upper portion 23 of U-shaped bracket 22 pass through the keyhole shaped aperture 57 in bracket 56.

It follows that, due to the cooperation of adjusting screw 20 and bracket 22 in aperture 57, the control knob 24 and J-shaped bracket 56 cannot become disengaged from such U-shaped bracket 22 and adjusting screw 20, as long as the iron remains assembled. In addition, due to the cooperation of notched aperture 57 in the J-shaped bracket 56, with the bracket 22 as the control knob 24 is rotated by an operator, such J-shaped bracket 56 rotates the adjusting screw 20 through the U-shaped bracket 22. The lower end of adjusting screw 20 through the insulating pin 47 thus is forced down upon the finger 46 which is rigidly attached to the resilient bimetallic supporting member 16 and bimetallic element 14 by rivet 44 so as to change the angular position of bimetallic element 14 with respect to the supporting structure 12. This action of the control knob 24 through the adjusting screw 20 thus changes the operating limits of the thermostat 10, selectively varying the operation thereof, in accordance with well-known principles.

When the iron is connected to a power supply (not shown), current will pass through resilient contact carrying member 18 increasing the temperature thereof, as previously noted, in addition to that of the sole plate. The increasing temperatures of the sole plate and the contact carrying member 18 cause an increase in the temperature of the bimetallic element 14, such element then flexing downwardly or in a counterclockwise direction. The free or movable end of the element 14 thus engages the upwardly extending boss 48 of member 18, biasing such member in a counterclockwise direction, and disengaging the cooperating contacts 38 and 39. The flow of current through the heating element 32 is thus interrupted, permitting the sole plate and contact carrying member 18 to decrease in temperature, whereupon the element 14 will return to its normal upper position, permitting the contacts 38 and 39 to be reengaged in a well known manner.

Various modifications may be made in the device embodying my invention without departing from the spirit and scope thereof, and I desire, therefore, that only such limitations shall be placed thereon as are imposed by the prior art and the appended claims.

I claim as my invention:

1. In a flat-iron structure having a heating element, a cover plate and a handle attached thereto having a skirt portion extending over said cover plate and with an upwardly extending opening therein, the combination of a thermostat embodying an upstanding adjusting screw, an upstanding bracket rigidly attached to said screw in a predetermined position, said adjusting screw and bracket extending above the cover plate, and a control knob assembly positioned above the cover and fitting over the end of said skirt portion and embodying a part loosely cooperating with the bracket to rotate the screw and adjust the operation of the thermostat.

2. In a flat-iron structure having a heating element, a cover plate and a handle attached thereto having a skirt portion extending over said cover plate and with an upwardly extending opening therein, the combination of a thermostat embodying an upstanding adjusting screw, an upstanding bracket attached to said screw, said adjusting screw and bracket extending above the cover plate, and a control knob assembly positioned intermediate the handle and cover plate and having an opening into which said skirt portion extends, said assembly cooperating with the bracket and screw and rotating about the screw as an axis for rotating the bracket to selectively adjust the thermostat.

3. In a flatiron structure, the combination of an iron body, a handle secured to the iron body, said handle having a grip portion, a leg or supporting portion and a skirt portion, said skirt portion being disposed adjacent the iron body, extending from said leg and terminating in spaced relation to the other end of said grip portion, the terminal portion being slightly spaced from said iron body to provide a generally horizontal channel of limited depth therebetween, a thermostat disposed in the iron body and having an adjusting shaft extending upwardly into said channel and an adjusting lever for operating said shaft, said lever having one end interlocked with said shaft and extending in said channel to the edge of the skirt portion, then upwardly and reversely above the skirt portion toward the axis of said shaft, said lever having a knob on the portion disposed directly above the skirt portion, said skirt portion holding said lever in assembled or interlocked relation with said shaft.

4. In a flatiron structure, the combination of an iron body including a cover plate having an opening in the top wall thereof, a handle secured to the iron body, said handle having a grip portion, a rear leg or supporting portion and a skirt portion, said skirt portion being disposed adjacent said iron body, extending from said rear leg and terminating in spaced relation from the front end of said grip portion, the front end portion of said skirt portion overlying said opening and a surrounding portion of said top wall and having a recess provided in its under surface over said opening and adjacent its front end, a thermostat disposed in the iron body and having an adjusting shaft extending upwardly through said opening and into said recess, and a lever for operating said shaft, said lever having one end coupled to said adjusting shaft for operating the same and extending in said recess from said shaft to the edge of the skirt portion, then upwardly and above the skirt portion reversely toward the axis of said shaft, said lever having a knob on the portion disposed directly above the skirt portion.

5. A flatiron including a soleplate, a thermostat for regulating the temperature of said soleplate, a cover plate having an opening in the top wall thereof, a skirt portion carried by said iron and overlying said opening and a surrounding portion of said top wall, said skirt portion being slightly spaced from said top wall to form a generally horizontal channel of limited depth, a thermostat adjusting shaft extending upwardly through said opening and into said channel, and an adjusting lever for operating said shaft, said lever having one end interlocked with said shaft and extending in said channel to the edge of the skirt portion, then upwardly and reversely above the skirt portion toward the axis of the shaft, said lever having a knob on the portion disposed directly above the skirt portion, said skirt portion holding said lever in assembled or interlocked relation with said shaft.

6. The structure set forth in claim 5 wherein said portion of said lever is formed with a noncircular opening and the upper end of said shaft is of complementary noncircular form and extends into said opening.

7. A flatiron including a soleplate, a thermostat for regulating the temperature of said soleplate, a cover plate having an opening in the top wall thereof, a handle carried by the iron and having an integral skirt portion overlying said opening and a surrounding portion of said top wall, said skirt portion being slightly spaced from said top wall to form a generally horizontal channel of limited depth, a thermostat adjusting shaft extending upwardly through said opening and into said channel, and a lever for actuating said shaft including a portion extending into and movable generally in a horizontal plane in said channel, said portion of said lever being interlocked with the upper end of said shaft to cause said shaft to rotate upon horizontal movement of said lever and to retain said portion of said lever in said channel, said skirt portion holding said portion of said lever in assembled or interlocked relation with said shaft.

8. The structure set forth in claim 7 wherein said portion of said lever is formed with a noncircular opening and the upper end of said shaft is of complementary noncircular form and extends into said opening.

EARL K. CLARK.